W. KELLY.
AUTOMOBILE CONSTRUCTION.
APPLICATION FILED SEPT. 28, 1908.

997,561. Patented July 11, 1911.
3 SHEETS—SHEET 1.

W. KELLY.
AUTOMOBILE CONSTRUCTION.
APPLICATION FILED SEPT. 28, 1908.

997,561.

Patented July 11, 1911.
3 SHEETS—SHEET 3.

Witnesses
Clarence E. Day.
N. W. Biller

Inventor
William Kelly
By Parker & Burton Attorneys

UNITED STATES PATENT OFFICE.

WILLIAM KELLY, OF DETROIT, MICHIGAN, ASSIGNOR TO EVERITT, METZGER, FLANDERS COMPANY, OF DETROIT, MICHIGAN, A CORPORATION OF MICHIGAN.

AUTOMOBILE CONSTRUCTION.

997,561.  Specification of Letters Patent.  Patented July 11, 1911.

Application filed September 28, 1908. Serial No. 455,032.

*To all whom it may concern:*

Be it known that I, WILLIAM KELLY, a citizen of the United States, residing at Detroit, county of Wayne, State of Michigan, have invented a certain new and useful Improvement in Automobile Construction, and declare the following to be a full, clear, and exact description of the same; such as will enable others skilled in the art to which it pertains to make and use the same, reference being had to the accompanying drawings, which form a part of this specification.

My invention relates to means for securing the engine to the chassis of an automobile, and for mounting a magneto thereon.

Figure 1:
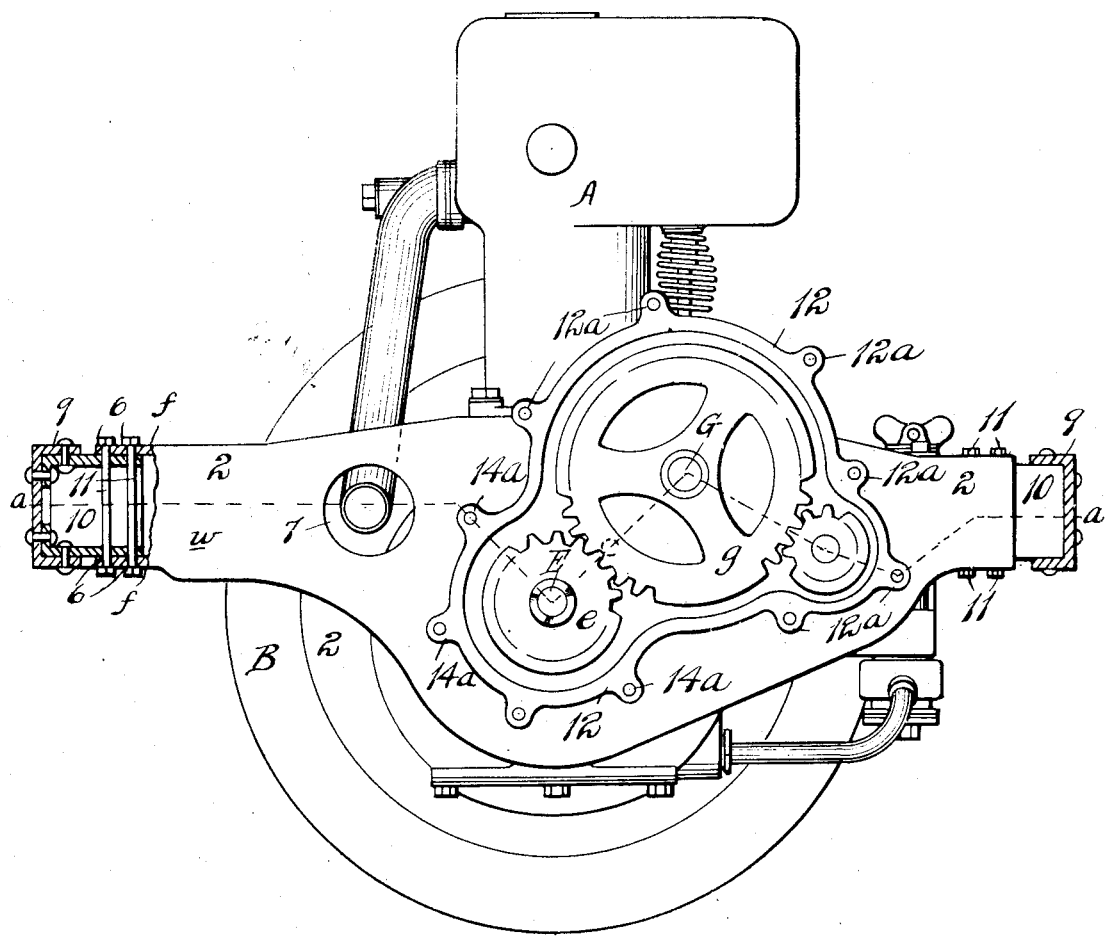
Figure 2:
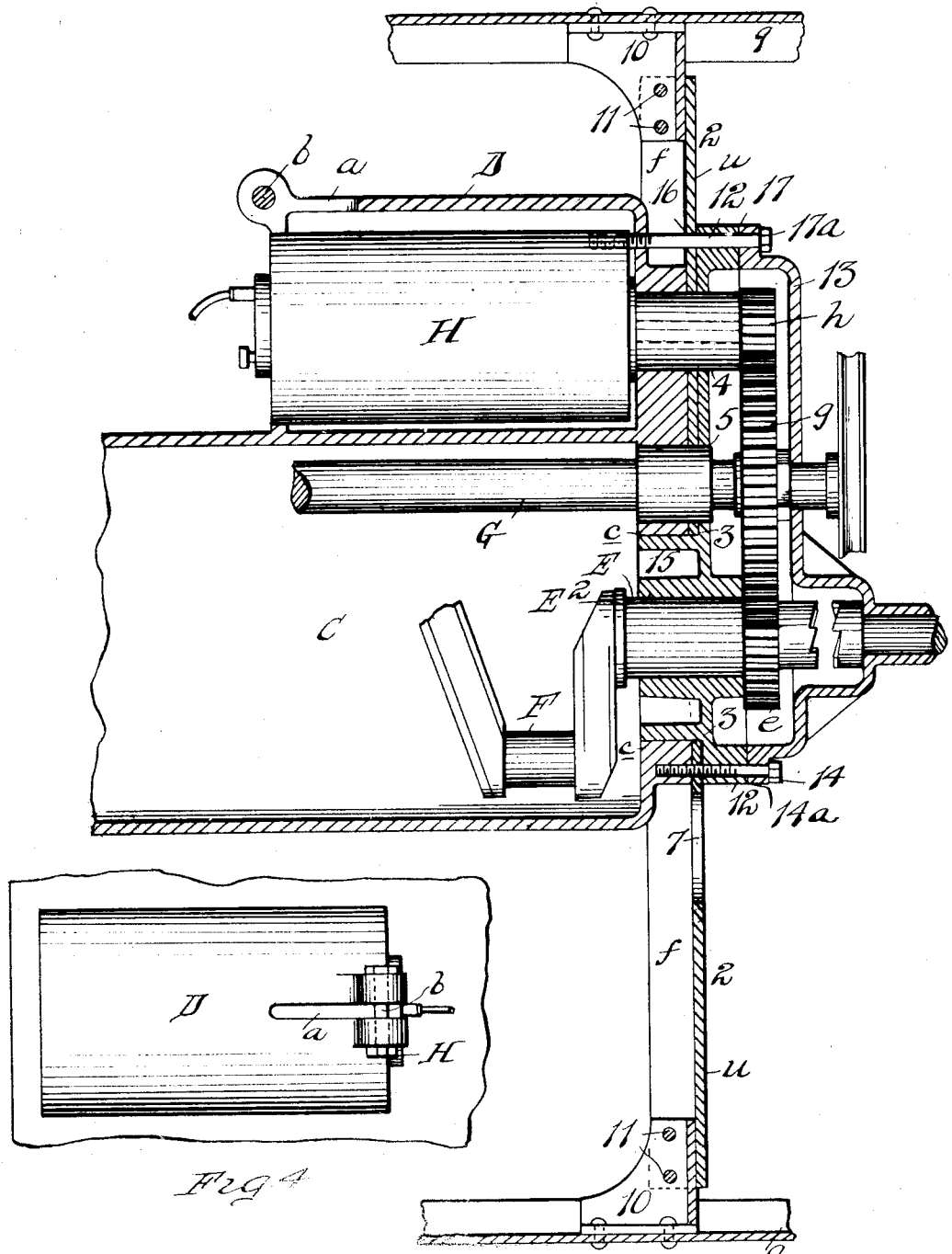
Figure 3:
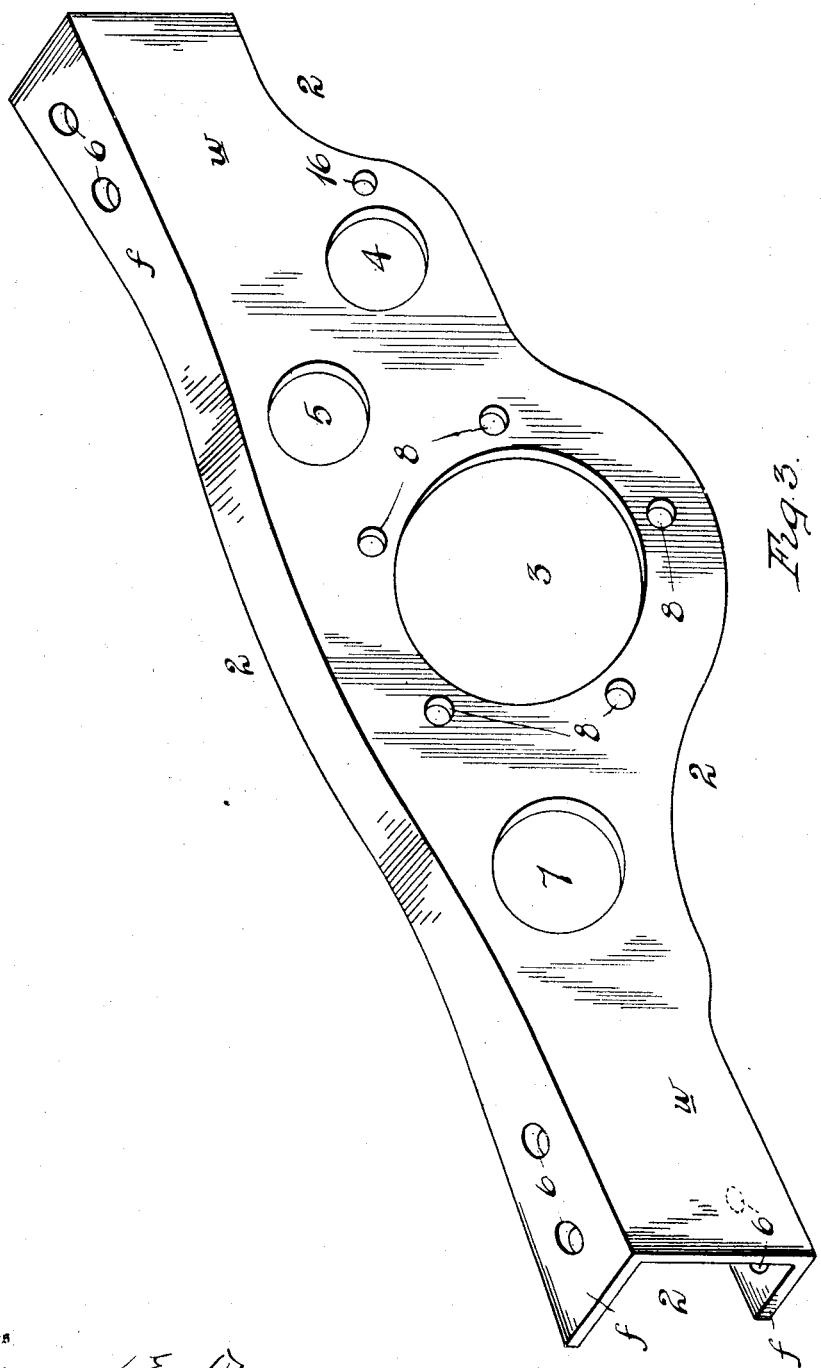

In the accompanying drawings—Figure 1, is a front view of an engine and so much of the chassis of an automobile as is necessary to illustrate its connection therewith, showing my invention, the cover of the gear casing being removed. Fig. 2, is a detailed sectional view on the line $a, a$, of Fig. 1. Fig. 3, is a perspective view of one of the securing brackets. Fig. 4, is a detail showing the method of securing the magneto in place at its left-hand end, as shown in Fig. 2.

A, is the engine. B, the fly-wheel. C, the crank case.

D, is a chamber formed integral with the crank case C, and adapted to contain the magneto.

E, is the crank shaft and F, the crank.

G, is a countershaft to which the reduced motion is communicated to operate the valves.

H, is a magneto secured in the chamber D, as hereinafter more particularly described.

$e$, is a gear wheel upon the shaft E, outside of the crank case C.

$g$, is a gear wheel of twice the diameter of the gear wheel $e$, secured upon the reduced motion shaft G, its teeth meshing with the teeth of the gear wheel $e$.

$h$, is a gear wheel upon the shaft of the magneto H, the teeth of the gear wheel $h$, meshing with the teeth of the gear wheel $g$.

2, is a hanger for supporting the engine; said hanger consists of a web $w$, and flanges $f, f$, extending at right angles to the web $w$, at its upper and lower edges.

3, 4, 5, 7, are apertures formed in the web of the hanger 2.

6, indicates bolt-holes in the flanges $f, f$, of the hanger 2, through which bolts 11, pass to secure the hanger in place.

8, indicates a series of bolt-holes through the web of the hanger 2, surrounding the opening 3.

9, 9, are the side bars of the chassis.

10, 10 are stampings riveted to the side bars 9, within the channels thereof. The flanges $f, f$, of the bracket 2, pass over the stampings 10, and are secured thereto by bolts 11, which pass through the bolt-holes 6, and corresponding holes in the stampings 10.

12, is a gear casing having a cover 13, and an annular projection 15, (Fig. 2) extending from its inner surface.

$c$, is a circular opening formed through the end wall of the crank case C.

$E^2$, is a bearing for the shaft E, formed integral with the gear case 12.

In assembling the parts the bracket 2, is placed with its web $w$, against the end of the crank case C, the opening 3, registering with the opening $c$, and the openings 4, 5, registering with corresponding openings in the end of the crank case and magneto case. The gear casing 12, is then placed against the web $w$, of said bracket, the annular projection 15, passing snugly through the hole 3, in the web $w$, and the aperture $c$ in the end of the crank case. There are apertures in said gear case corresponding to the apertures 4, 5, of the web of the bracket 2, through which project the shaft G, and the shaft of the magneto. The magneto H, is cylindrical and passes through a cylindrical opening in the casing D, its shaft passing through the opening in the end of said casing and through the opening 4, in the web of bracket 2, and the corresponding opening in the gear case 12. The left-hand end of the casing D, is open and is circular in form adapted to fit upon the cylindrical surface of the magneto H. The casing D, is slotted as by a saw-kerf. A bolt $b$, is provided for drawing the separated parts together to bind the magneto at its left-hand end, as shown in Fig. 2, firmly in place; see also Fig. 4.

The gears e, g, h, are secured in place and the gear case cover, 13, is put in position and secured to the gear case 12, by bolts passing through bolt-holes 12ª, in ears formed upon the casing 12, and cover 13. There are also bolts, as 14, Fig. 2, which pass through the cover 13, through the wall of the gear casing 12, and into the crank case C. There are five bolts, 14, passing through bolt-holes 14ª (Fig. 1). There is also a bolt 17ª, which passes through a bolt-hole in the cover 13, a bolt-hole 17, in the wall of the gear casing 12, and through the bolt-hole 16, in the web of the bracket 2, through the end wall of the casing D, and engaging screw-threads in the casing of the magneto H, to hold said magneto accurately and firmly in position (see Fig. 2).

The bracket 2 may be made of pressed sheet steel. The apertures 4, 5, 3, in the web embrace parts upon the engine; said parts afford broad bearing surfaces which are engaged by the walls of said apertures and in connection with the bolts 14, hold the engine firmly, rigidly and permanently in position so that it will not work loose. The gear casing 12, in connection with the end surface of the crank case C, forms a broad surfaced clamp for securing the bracket 2, to the crank case. The annular projection 15, extending from the gear case 12, serves to accurately locate said gear case in position and provides an extended bearing surface against which the wall of the aperture 3, in the web w, of the bracket 2, bears.

By forming the case D, integral with the crank case C, their ends being in the same plane, I provide a broad bearing surface for the web of the bracket 2, and provide an inclosed casing for the magneto in which it may be accurately located by unskilled labor and in which it will be securely held, the bolt 17ª, assisting not only to secure the magneto in place, but helping to secure the gear case 12, bracket 2, and gear case cover 13, in place. The gear wheel h, on the end of the magneto shaft is brought into position to engage with the reduced motion gear g, so that a simple, strong and convenient construction is secured.

What I claim is:

1. The combination of an engine having a crank case, and having an opening for the main shaft in the end of said crank case, a main shaft passing through said opening, a part constituting a bearing for said main shaft fitting into said opening, a bracket having an aperture therein, the wall of said aperture being adapted to fit around said bearing part, and means for securing said bracket to said crank case.

2. The combination of an engine having a crank case, having an aperture through the wall thereof, a shaft extending through said aperture, a gear wheel on said shaft outside of said crank case, a casing surrounding said gear wheel and having a part extending through said aperture, a bracket located between said casing and the crank case, and surrounding the said part of said casing, substantially as and for the purpose described.

3. The combination of an engine having a wall provided with an aperture, a casing secured to said engine and having a projection extending through said aperture, and a supporting bracket for said engine fitting over said projection between said casing and said wall, said casing being adapted to be clamped against said bracket to hold the same in place.

4. The combinaton of an engine having a crank case, having an aperture through the wall thereof, a shaft extending through said aperture, a gear wheel on said shaft outside of said crank case, a casing surrounding said gear wheel and having a part extending through said aperture, a bracket located between said casing and the crank case and surrounding the said part of said casing, means for securing said casing to said crank case so as to clamp said bracket between said casing and said crank case, substantially as and for the purpose described.

5. The combination of an engine having a crank case having an aperture through the wall thereof, a shaft extending through said aperture, a gear wheel on said shaft outside of said crank case, a casing surrounding said gear wheel and having a part extending through said aperture surrounding said shaft and forming a bearing therefor, a bracket located between said casing and the crank case and surrounding the said part of said casing, means for securing said casing to said crank case so as to clamp said bracket between said casing and said crank case, substantially as and for the purpose described.

6. The combination of a crank case, a main shaft extending through the end thereof, a counter-shaft extending through the end of said case, a bracket surrounding said main shaft and counter-shaft and secured to the end of said crank case, said bracket being adapted to support said crank case and hold the same in position.

7. The combination of a crank case, a main shaft extending through the end thereof, a counter-shaft extending through the end of said crank case, a magneto shaft extending through the end of said crank case, a bracket surrounding said shafts and adapted to be secured to said crank case said bracket being adapted to support said crank case and hold the same in position.

8. The combination of a crank case, a main shaft extending through the end thereof, a counter-shaft extending through the end of said crank case, a magneto shaft extending through the end of said crank case, a bracket surrounding said shafts and adapted to be secured to said crank case, gear wheels on the outer ends of said shafts, a gear casing inclosing said gear wheels and means for securing said gear casing to said crank case to bind said bracket between said crank case and said gear casing said bracket being adapted to support said crank case and hold the same in position.

In testimony whereof, I sign this specification in the presence of two witnesses.

WILLIAM KELLY.

Witnesses:
VIRGINIA C. SPRATT,
ELLIOTT J. STODDARD.